(12) United States Patent     (10) Patent No.: US 9,414,247 B2
Huang     (45) Date of Patent: Aug. 9, 2016

(54) SERVICE PROBLEM DIAGNOSIS FOR MOBILE WIRELESS NETWORKS

(75) Inventor: Yangcheng Huang, Athlone (IE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 253 days.

(21) Appl. No.: 14/000,866

(22) PCT Filed: Feb. 21, 2011

(86) PCT No.: PCT/EP2011/052486
§ 371 (c)(1), (2), (4) Date: Nov. 4, 2013

(87) PCT Pub. No.: WO2012/113436
PCT Pub. Date: Aug. 30, 2012

(65) Prior Publication Data
US 2014/0043983 A1    Feb. 13, 2014

(51) Int. Cl.
*H04L 12/24* (2006.01)
*H04W 24/08* (2009.01)
*H04L 12/26* (2006.01)

(52) U.S. Cl.
CPC ........... *H04W 24/08* (2013.01); *H04L 41/0677* (2013.01); *H04L 43/08* (2013.01); *H04L 12/2477* (2013.01); *H04L 41/064* (2013.01); *H04L 41/142* (2013.01)

(58) Field of Classification Search
CPC . H04L 41/0677; H04L 41/142; H04L 41/064; H04L 12/2477; H04W 24/08
See application file for complete search history.

(56) References Cited

U.S. PATENT DOCUMENTS

2006/0246888 A1   11/2006   Bender et al.
2007/0129086 A1    6/2007   Toone
2010/0284293 A1* 11/2010   Watanabe et al. ............. 370/252

FOREIGN PATENT DOCUMENTS

EP      2 237 596 A1   10/2010
WO   2009155971 A1   12/2009

OTHER PUBLICATIONS

Giannotti et al. "Trajectory Pattern Mining" Research Track Paper, KDD 2007, pp. 330-339.
Gudmundsson et al. "Movement Patterns in Spatio-Temporal Data" Encyclopedia of GIS, 2008, pp. 726-732.
Jeung et al. "Mining Trajectory Patterns Using Hidden Markov Models" LNCS 4654, 2007, pp. 470-480.
Lee et al. "Trajectory Clustering: A Partition-and-Group Framework" SIGMOD 2007, 12 pages.
(Continued)

*Primary Examiner* — Jae Y Lee
*Assistant Examiner* — Aixa Guadalupe-Cruz
(74) *Attorney, Agent, or Firm* — Rothwell, Figg, Ernst & Manbeck, P.C.

(57) ABSTRACT

A method for determining location of a failure causing degradation of a service in a mobile communications network is disclosed. Service trajectories for the mobile terminals are determined (104) by correlating earlier obtained movement trajectories (102) of individual mobile terminals with service session records of the mobile terminals. In the next step distributions of the service trajectories of mobile terminals with degraded service are determined and then a network element around which the service trajectories converge is identified (108) as the location of the failure. An apparatus, a communications network and a computer program product are also disclosed.

24 Claims, 7 Drawing Sheets

(56) References Cited

OTHER PUBLICATIONS

Li et al. "Incremental Clustering for Trajectories" Database Systems for Advanced Applications 2010, Part II, LNCS 5982, pp. 32-46.

Monreale et al. "WhereNext: a Location Predictor on Trajectory Pattern Mining" KDD 2009, pp. 637-645.

International Searching Authority, Notification of Transmittal of the International Search Report and the Written Opinion of the International Searching Authority, issued in corresponding International Application No. PCT/EP2011/052486, dated Nov. 3, 2011, 16 pages. (previously submitted).

3GPP, 3rd Generation Partnership Project; Technical Specification Group Services and System Aspects; Transparent end-to-end Packet-switched Streaming Service (PSS); Protocols and codecs (Release 9), 3GPP TS 26.234 V9.5.0, 2010, 188 pages.

\* cited by examiner

– – – handover data
——— GPS data

```
Input:
    Service Trajectories S;
    MinOverlaps;      // Minimum number of trajectory overlaps to be considered as a cluster
Output:
    Trajectory Cluster C;

temporalTrajectoryClustering(S, MinOverlaps)
    C=NULL;
    for each unvisited trajectory s in S
        Mark s as visited;
        S'=getOverlappedTrajectory(s);
        max_overlap = calcMaxOverlap (s, S');
        if (max_overlap < MinOverlaps)
            Mark s as noise;
        else
            Remove trajectories that don't contain the max overlap from S';
            C = new cluster;
            expandCluster (s, S', C, MinOverlaps);

expandCluster(s, S', C, MinOverlaps)
    C = C ∪ {s};
    for each trajectory s' in S'
        if (s is not visited)
            Mark s' as visited;
            S''=getOverlappedTrajectory(s');
            max_overlap' = calcMaxOverlap (s',S'');
            if (max_overlap' >= MinOverlaps)
                Remove trajectories that don't contain the max overlap from S'';
                S' = S' ∪ S'';
        if s' is not yet a member of any cluster
            Add s' to cluster C calcMaxOverlaps (s, S')
    max_overlap = 0;
    Sort starting timestamps and ending timestamps of each trajectory in S' based on
            their temporal sequence and build a timestamp array TS;
    Remove elements before the starting timestamp of s from TS;
    Remove elements after the ending timestamp of s from TS;
    for each element ts in TS                    // Find the maximum overlaps
        Calculate the number of overlaps n at ts + ε;   // ts+ε smaller than next element in TS
        if (n > max_overlap)
            assert (n > prev_n)
            assert (ts is a starting timestamp)
            max_overlap = n;
            max_overlap_startingPoint = ts;
        if (n < prev_n)
            assert(ts is an ending timestamp)
            max_overlap_endingPoint = ts;
            max_overlap_duration = max_overlap_endingPoint
                    - max_overlap_startingPoint;
            if (max_overlap_duration < MinOverlapDuration)  // Minimum overlap duration
                max_overlap = 0;                             // Drop this overlap if too short
        prev_n = n;
    return max_overlap;
```

*FIG. 13*

SERVICE PROBLEM DIAGNOSIS FOR MOBILE WIRELESS NETWORKS

CROSS REFERENCE TO RELATED APPLICATION(S)

This application is a 35 U.S.C.§371 National Phase Entry Application from PCT/EP2011/052486, filed Feb. 21, 2011, designating the United States, the disclosure of which is incorporated herein in its entirety by reference.

TECHNICAL FIELD

The present invention relates to mobile communications networks, in general, and in particular to determining location of a failure or failures causing degradation of a service or multiple services in a mobile communications network.

BACKGROUND

In networks providing communications services one of primary responsibilities of service providers is to ensure that their services provide a level of performance and robustness that satisfies the commitments specified in their service level agreements (SLAs) with customers, and at the same time maintain efficient use of resources. A well known approach is to monitor quality and behaviour of the services, identify unusual or anomalous activity that either directly indicates or indirectly implies that the service is no longer behaving satisfactorily, and analyse root causes of service performance degradations.

In general, there are two types of causes for service problems: hard failure and soft failure. Hard failure refers to a failure event such as a link breakage or a node going down, which is well observable through network alarms or other notifications in Operation And Maintenance (O&M) systems. Compared to hard failure events, a soft failure is less noticeable but recurring network condition. For example, the term soft failure refers to service degradations which are short in duration and are caused by performance impairing events that occur intermittently over an extended period of time. Problems may have disappeared before a network operator can react to them. Such problems may recur and keep reappearing, and can cause repeated service degradation to user services. In some cases, such conditions develop slowly and can aggregate over time before it eventually turns into a serious hard failure. For example, repeated wireless flaps may be observed over time before the link completely fails. Even if the problem does not result in any hard failure, the performance degradation caused can add up to significant impact to user services and system services and affect user satisfaction with service quality. Undoubtedly, the necessity of discovering the underlying root causes of such soft failures is at least as critical as hard failures before the conditions can be permanently eliminated from the network. It is essential to troubleshoot and repair such network conditions in a timely fashion in order to ensure high reliability and performance in large mobile networks.

Existing O&M solutions are designed to diagnose hard failures, especially alarm based Fault Management and Performance Management systems. In contrast, the solution to be disclosed is designed to detect and localize service problems caused by soft failures in mobile wireless infrastructures.

Diagnosis of such soft-failure service problems in wireless infrastructures, like for example 3G/LTE networks with thousands of access nodes where normal service behaviour is highly dynamic, presents serious challenges.

(1) Changing network topology. User Equipment (UEs) may frequently change their point of attachment and accordingly network or service paths. It is difficult to build causal relations (or inference graphs) between service problems and network events to pinpoint the causes of performance problems. Existing network fault diagnosis systems, either passive or active (i.e. probing), implicitly assume that the fundamental structure of the network is either static or changes slowly. This assumption allows these systems to build inference graphs to pinpoint the causes of performance problems. However, these approaches cannot be applied to mobile networks.

(2) Absence of full-scale continuous probing or monitoring points. As discussed earlier, soft failures are unpredictable and therefore require full-scale measurements. However, in a network primarily consisting of roaming users, full-scale network-wide probing or monitoring infrastructure is impractical and expensive to deploy.

(3) Difficulties in reproduction of the problematic conditions. The problems may not be detected based on probing solutions if the problematic conditions are not reproducible.

Service performance monitoring is one known diagnosis solution. It uses terminal reports, or passively collected packet traces, to calculate service performance metrics (e.g. round-trip times). Terminal reports refers to Quality of Service (QoS) reports (e.g. RTCP reports for RTP streams; throughput, packet loss, latency and jitter) and Quality of Experience (QoE) reports (e.g. 3GPP TS 26.234; based on HTTP or RTSP). Packet traces can be used to analyze service-level quality. Service quality alarms can be obtained from service quality monitors deployed within the service provider network. The monitors gather statistics such as packet loss, packet delay and service outage durations. These statistics are then used as quality indicators for services.

Using network events and/or counters is another known solution. Network events and/or counters are defined and configured for network events or any other data sources (such as terminal types) to calculate statistics. The data analysis is normally based on simple statistical methodologies, typically highest-failure-rate style analysis using Business Intelligence tools. For example, this approach can calculate percentage of attach success ratio or Packet Data Protocol (PDP) context activation success ratio for a particular mobile device type based on subscriber session analysis. This may enable the operator to identify service problems caused by, for example, designs of mobile devices.

However, neither service performance monitoring nor network events or counters are capable of accurately identifying root causes of soft failure service problems. Service performance monitoring may only disclose symptoms of service problems and fail to determine their causes. On the other hand, network counters/events are usually unaware of services or applications. In the best case, failure events can only be associated with PDP sessions.

SUMMARY

It is the object of the present invention to obviate at least some of the above disadvantages and provide an improved determining location of a failure causing degradation of a service in a mobile communications network.

Accordingly, the invention seeks to preferably mitigate, alleviate or eliminate one or more of the disadvantages mentioned above singly or in any combination.

According to a first aspect of the present invention there is provided a method of determining location of a failure causing degradation of a service in a mobile communications network. The method comprises obtaining movement trajectories of mobile terminals operating in the network and determining service trajectories for the mobile terminals by correlating the movement trajectories of individual mobile terminals with service session records of the mobile terminals. In the next step distribution of the service trajectories of mobile terminals with degraded service is determined and then a network element around which the service trajectories converge is identified as the location of the failure.

According to a second aspect of the present invention there is provided an apparatus for determining location of a failure causing degradation of a service in a mobile communications network. The apparatus comprises a mobility monitor module adapted to obtain movement trajectories of mobile terminals operating in the network, a service monitor module adapted to determine service trajectories of the mobile terminals. The service trajectories are determined by correlating the movement trajectories of individual mobile terminals with service session records of the mobile terminals. The apparatus also comprises an analyser module adapted to determine distribution of the service trajectories of mobile terminals with degraded service and to identify a network element around which the service trajectories converge as the location of the failure.

According to a third aspect of the present invention there is provided a mobile communications network comprising a plurality of network elements, at least part of the network elements being in communication with a second plurality of wireless mobile terminals operating in the network. The network further comprises an apparatus for determining location of a failure causing degradation of a service in the mobile communications network. The apparatus comprises a mobility monitor module adapted to obtain movement trajectories of mobile terminals operating in the network, a service monitor module adapted to determine service trajectories of the mobile terminals. The service trajectories are determined by correlating the movement trajectories of individual mobile terminals with service session records of the mobile terminals. The apparatus also comprises an analyser module adapted to determine distribution of the service trajectories of mobile terminals with degraded service and to identify a network element around which the service trajectories converge as the location of the failure.

According to a fourth aspect of the present invention there is provided a computer program product adapted to perform, when executed on a computer, a method of determining location of a failure causing degradation of a service in a mobile communications network. The method comprises obtaining movement trajectories of mobile terminals operating in the network and determining service trajectories for the mobile terminals by correlating the movement trajectories of individual mobile terminals with service session records of the mobile terminals. In the next step distribution of the service trajectories of mobile terminals with degraded service is determined and then a network element around which the service trajectories converge is identified as the location of the failure.

Further features of the present invention are as claimed in the dependent claims.

BRIEF DESCRIPTION OF THE DRAWINGS

The present invention will be understood and appreciated more fully from the following detailed description taken in conjunction with the drawings in which:

FIG. 13 illustrates pseudocode for implementing temporal clustering in embodiments of the present invention.

DETAILED DESCRIPTION

Mobility of mobile terminals (also known as user equipment) receiving services from the communications network is a factor that affects quality of the service as perceived by individual users. When the user with his or her mobile terminal roams the network the conditions in which the service is received change. The user may move away from a base station that serves the mobile terminal and the signal strength drops together with bit rate. Moving to a cell with much higher density of other mobile terminals using the same base station or even the same service may also has impact on the quality of the service. Mobility of the terminals also brings challenges to using terminal reports to pinpoint service problems. Since user terminals may be attached to different access nodes when a service is delivered, it is difficult to localize problematic network elements simply based on terminal reports.

To simplify understanding of embodiments of the present invention two terms are introduced: movement trajectory and service trajectory.

A movement trajectory is the path a moving object follows through space as a function of time.

A service trajectory is defined as segments of the movement trajectory where a specified service is consumed by a moving user. For a particular service, service trajectory of a mobile user is computed by correlating its service records with its movement trajectories, based on temporal co-occurrence. The length of service trajectory includes both temporal factor (e.g. the duration of service access) and spatial factor (e.g. location, direction and/or distance of movement). A movement trajectory may be correlated with one or multiple service records, when two or more services are used at the same time (e.g. mobile TV and email), or even with no service records (when the mobile terminal does not use any service). Service trajectory describes service access during mobile terminal movements. Service trajectory has a temporal dimension, in addition to movement trajectory. The user may not move, but still may be using services provided by the network.

Figure 5:
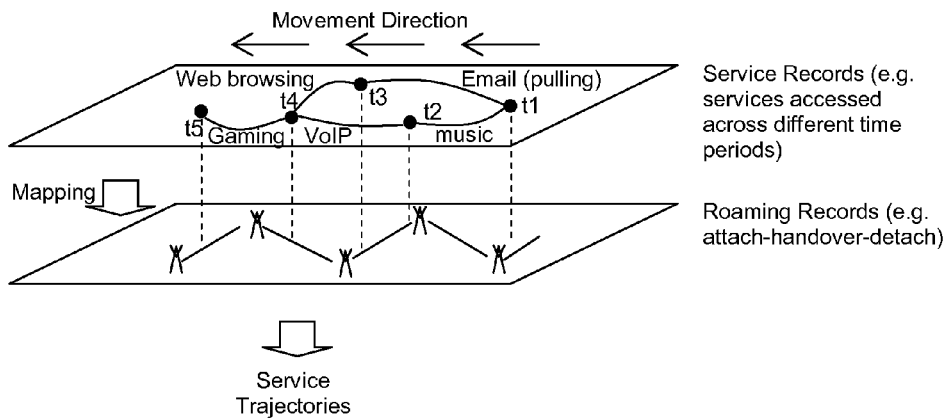
FIG. 5 and FIG. 6 illustrate creating service trajectories in embodiments of the present invention.
Figure 6:
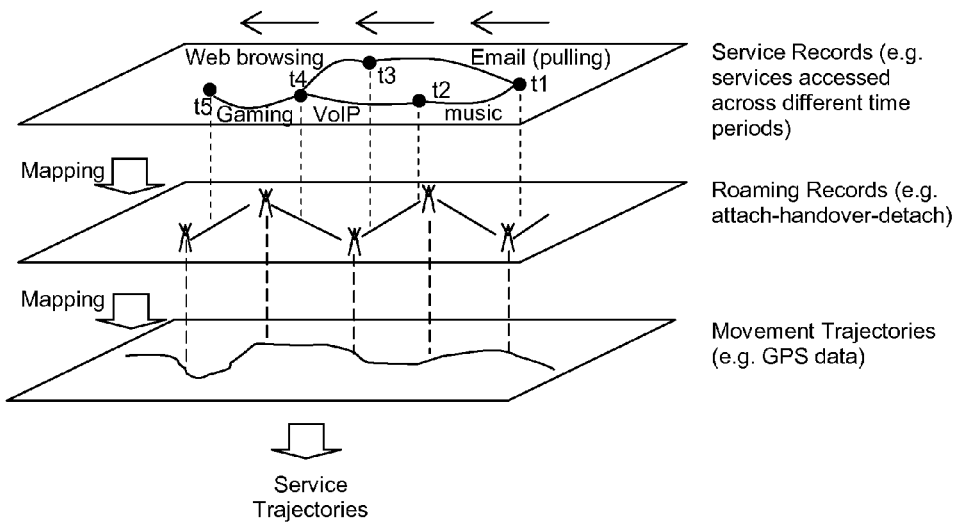

FIG. 5 and FIG. 6 illustrate how the service trajectories are determined. In a most basic embodiment, FIG. 5, the movement trajectory is defined by roaming records, i.e. straight lines connecting base stations serving the mobile terminal as it roams through the network (illustrated on the lower plane of FIG. 5). The upper plane of FIG. 5 illustrates various services accessed by the user of the roaming mobile terminal. Starting from time t1 the mobile terminal used a music service until time t2. Between t1 and t3 the mobile terminal used pull email services. It can bee seen that using the two services partially overlapped in time. Between t2 and t4 VoIP service has been used and between t3 and t4 the terminal was used to access the Internet. Again internet browsing and VoIP service partially overlapped. From t4 to t5 the mobile terminal was used for gaming. When this information is correlated with the movement trajectory a service trajectory is created.

FIG. 6 illustrates similar process, but here, in addition to roaming records GPS tracking data is also available (the bottom plane in FIG. 6). Combining GPS data with the roaming records allows for precise locating the base stations in relation to the actual path followed by the mobile terminal. This is then correlated with the service records in the same way as in the embodiment illustrated in FIG. 5 and described above.

Figure 7:
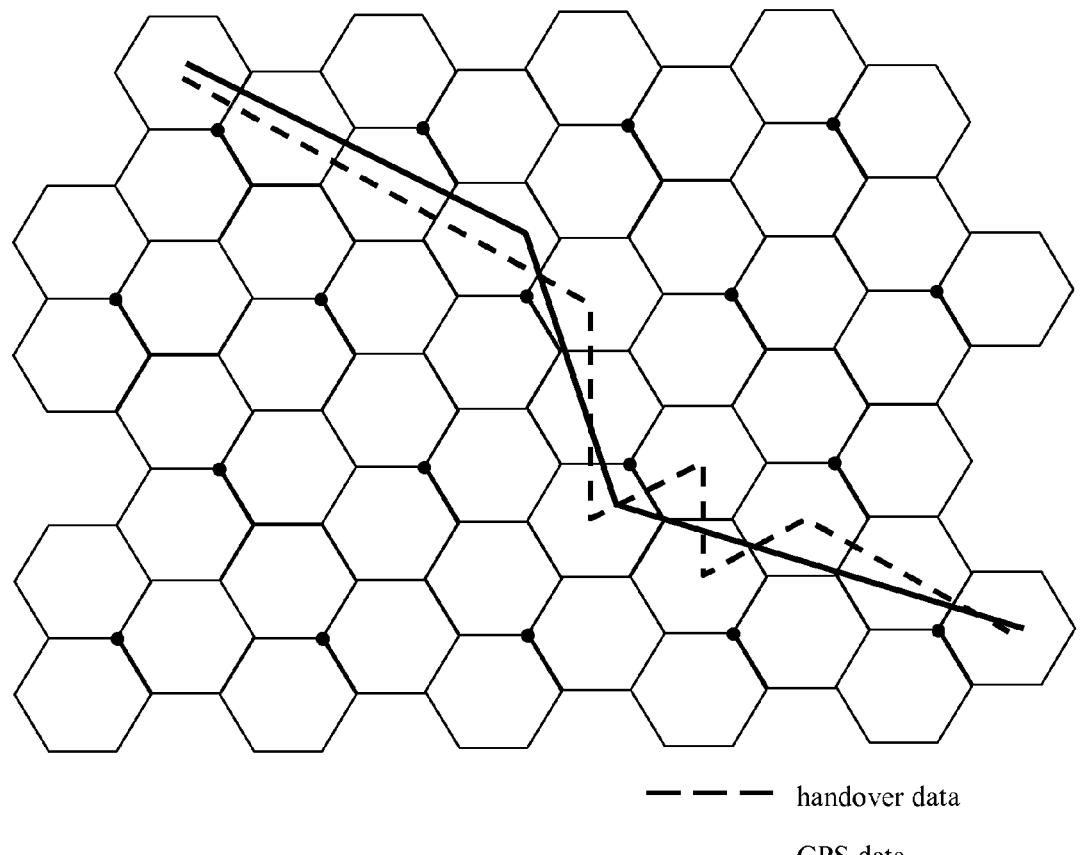
FIG. 7 illustrates movement trajectories determined based on GPS data and handover data for use in embodiments of the present invention.

FIG. 7 illustrates the difference between movement trajectory obtained based on GPS tracking (solid line) and based on roaming data (dashed line). In the case of roaming data (handover events) we only know which base station the mobile terminal was attached to and not its exact location and this is why the trajectory connects the centres of the cells.

Very broadly, in embodiments of the present invention movement trajectories of a mobile terminal are correlated with service records in order to compute service trajectories. To identify where in the network a failure is located (i.e. to identify network element responsible for the failure or service degradation) service trajectories of users with degraded service quality are clustered (grouped). Clustering allows for grouping of elements that are characterised by a defined degree of similarity. If a service accessed by users suffers degradation of quality and this degradation has the same root cause then their service trajectories can be grouped/clustered based on this similarity. Even if the root cause is not easy to identify by analysing service logs of an individual mobile terminal or a single service trajectory the way it manifests to a number of mobile terminals (location, time, type of service) gives enough information to group/cluster the service trajectories based on their similarity. Such cluster of service trajectories points to a network element shared by the mobile terminals and in this way it indicates location of the fault in the network.

In it suggested in embodiments of the present invention to analyse movements of mobile terminals together with services used by these mobile terminals. The correlation based on temporal co-occurrences in order to be successfully used to identify location of a fault must take into account at least the following problems and limitations.

Inaccurate timestamps of terminal reports may result in violation of causality. For all types of terminal reports latency often exists between the time when a failure occurs and the time when it shows up in the terminal reports. The latency may be introduced by buffering and caching in streaming services, periodic measurement latency, propagation delays and unsynchronized clocks. In a network primarily consisting of roaming users, it is highly possible that the attached access node when the terminal report is received is not the access node(s) when performance problem actually occurs. Therefore it is crucial to make service problem analysis robust to inaccurate report timestamps.

Traffic overhead. Introducing real-time or near-real-time terminal reporting is not feasible as this would cause undesired traffic overhead consuming bandwidth available to mobile terminal accessing services. This, in turn, would also have a negative impact on user's perception of the service quality.

Figure 1:
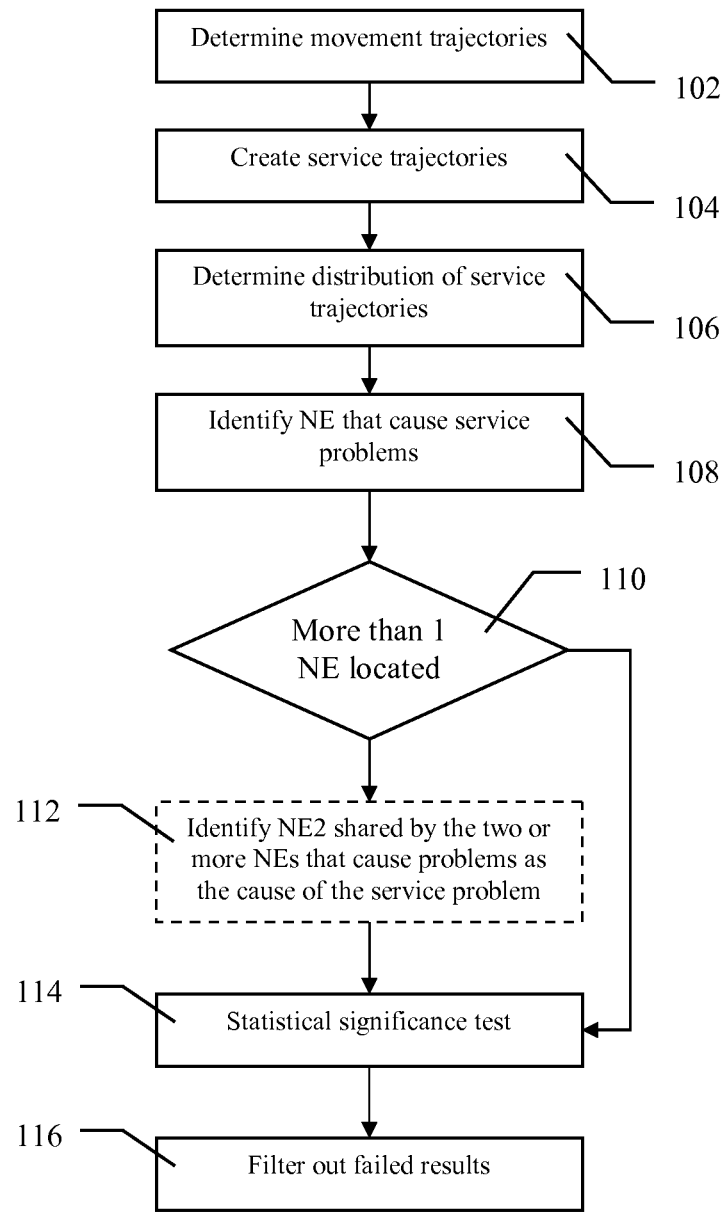
FIG. 1 is a diagram illustrating a method of determining location of a failure in one embodiment of the present invention.

With reference to FIG. 1 a method of determining location of a failure causing degradation of a service in a mobile communications network is disclosed. As mentioned earlier, the method used in various embodiments of the present invention requires determining service trajectories. To achieve this, in the first step, movement trajectories of mobile terminals operating in the network are obtained, 102. For all mobile terminals the network knows their roaming records and this roaming records can be used to produce movement trajectories. Depending on individual mobile terminals and their configuration the movement trajectory may also contain GPS tracking data. Although the modern mobile terminals are often equipped with GPS modules they are not constantly used because they consume battery power. Even if the GPS data are logged by a mobile terminal they do not necessarily have to be reported to the network. In situations where a GPS receiver in a mobile terminal is running and the mobile terminal is configured to report the GPS logs to the communications network a more accurate movement trajectory is calculated. From a plurality of mobile terminals a mixture of movement trajectories will be obtained and most likely majority of them will be based on roaming data.

In the next step service trajectories for mobile terminals are determined, 104. As explained above the service trajectories are computed by correlating the movement trajectories of individual mobile terminals with their corresponding service session records.

It is important to understand that in the embodiments of the present invention timestamps from the service records do not have to be accurate because the correlated results are not directly used to pinpoint the problems. The fact that the present invention in its embodiments does not require accurate timestamps is an important advantage. By accepting the inaccurate timestamps of service quality feedbacks and relaxing the requirements on granularity of terminal reporting the invention makes full use of existing data sources such as customer care records and mobility records.

Service session records of a particular service can be obtained for example from service detail records (SDRs), Quality of Experience (QoE) reports and customer trouble tickets.

Service detail records are computer records produced by nodes of the service and contain details of the service data sessions. Depending on implementation the SDR includes timestamp, service type, duration of the session, network element ID, etc. SDRs can be collected for example from a content billing system of the data network. They may also be collected from the service layer, for example, the Charging Details Records (CDRs) in the on-line and off-line charging support of, for example, Ericsson Content Delivery System. The CDRs are generated at completion of each streaming session. One example of information fields comprised in such CDR is presented in table 1 below.

TABLE 1

| Timestamp | CDR number | Trigger |
|---|---|---|
| Context Id | MSISDN | User IP Address |
| Payment Method | Network Element Id | SGSN Address |
| Service Type | Content URI | Transferred Volume |
| Time Duration | Debited Cost | Content Rate |
| Price Type | Currency Code | Currency Exponent |

QoE reports. QoE reporting mechanisms of 3GPP TS 26.234 defines that the QoE metrics are reported after the service session via the reception reporting procedure using HTTP in a single TCP session. Therefore, session details like session duration are available from such QoE reports.

Customer trouble tickets are generated when a customer calls the network operator regarding service disruptions. The trouble tickets are associated with different types of performance issues, the starting and ending time periods, the customer account number, etc.

As a result of correlation between movement trajectory and service records a service trajectory is produced. An example of such a service trajectory is presented in table 2 below.

TABLE 2

| Field | Value |
| --- | --- |
| Service type | Web browsing |
| Application type | Web video (HTTP progressive downloading) |
| Starting point | {GPS_INFO} (put cell ID here if there is no GPS information) |
| Starting timestamp | 2010-08-18 17:50 |
| Waypoint 1 | {GPS_INFO} (put cell ID here if there is no GPS information) |
| Waypoint1 timestamp | 2010-08-18 17:55 |
| . | . |
| . | . |
| . | . |
| Waypoint n | {GPS_INFO} (put cell ID here if there is no GPS information) |
| Waypoint n timestamp | 2010-08-18 18:50 |
| Ending point | {GPS_INFO} (put cell ID here if there is no GPS information) |
| Ending timestamp | 2010-08-18 18:59 |

In the illustrated embodiment the service trajectory specifies the service and application which accesses the service. This is followed by a series of points defining spatial position of the mobile terminal. Preferably, the spatial position is defined using GPS data, but if this is not available then Cell ID from handover events is used.

In the next step distributions of the service trajectories of mobile terminals with degraded service are determined, 106. To determine how the service trajectories are distributed in one embodiment these service trajectories are grouped or assigned into subsets, using clustering analysis methods. The clustering is performed to explore similarities of service trajectories of users with degraded service performance. Service trajectories in the same cluster show similarities in certain aspect(s). In a preferred embodiment only service trajectories of users with degraded service performance are clustered in order to reduce resource requirements for processing these service trajectories. It is possible, however, in an alternative embodiment to perform clustering of all available service trajectories. This is, however, less preferred because it would require substantially increased processing resources. Especially if one realises that in a normally operating network a vast majority of users receives service at appropriate level.

Therefore, in a preferred embodiment, in order to reduce requirement for processing resources in the step of determining service trajectories, 104, only service trajectories of mobile terminals with degraded service are determined.

Once the clustering is carried out the distribution of the service trajectories can be examined. Service trajectories that are similar are grouped in clusters. If the failure is related to a particular network element, e.g. a base station (NodeB or eNodeB, etc.) then terminal servers using this particular base station for accessing the service will have similar service trajectories (they have problems with the service and they used the same base station), i.e. will be clustered, and in graphical representation these trajectories will converge around the same base station. In one embodiment of the method of the present invention the network element around which the service trajectories converge is identified as the location of the failure, 108.

Further details of processing the service trajectories that improve accuracy of identification of the location of the fault and reduce processing overhead are discussed below in description of various embodiments.

Figure 4:
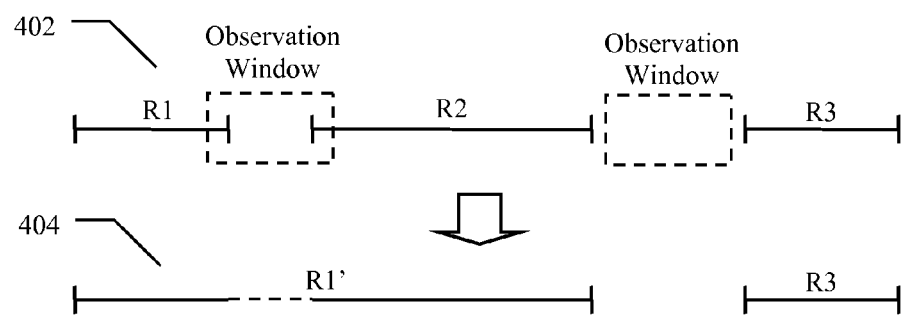
FIG. 4 illustrates merging service trajectories in one embodiment of the present invention.

It is understood that in accessing a particular service there may be idle periods which appear as if the service is not used. For example, if the user is browsing the Internet the browsing may stop for a while because the user is reading the content of the web page he just found. However, after he finished reading the page, he starts browsing the internet once again. On the other hand, when the service accessed is a video streaming session one would not expect breaks. Therefore, in a preferred embodiment, if the gap between two successive service records, from the same mobile terminal, of the same service is shorter that a defined observation window then these two service records are merged into one and the gap between them is ignored. The length of the observation window is, preferably, defined for the different types of services. In one embodiment the observation window for browsing internet is longer than the observation window for streaming services. On the other hand, if the gap between two successive records of the same service is longer than the observation window, the records are treated as separate service accesses and be mapped onto movement trajectories separately. This is illustrated in FIG. 4, where reference 402 shows three service records R1, R2 and R3, and an observation window. The gap between service records R1 and R2 is shorter than the observation window and the gap between service records R2 and R3 is longer that the observation window. In consequence, the service records R1 and R2 are merged into service record R1' and the service record R3 remains separate, 404.

An important advantage of this approach is that merging service records allows for significant reduction of the calculation overhead while not affecting the accuracy of problem diagnosis.

In another, alternative embodiment the length of the observation window is determined dynamically using statistical methods (based on historical gap values between service records) and methods known as machine learning.

The operation of clustering the service trajectories used in the step of determining distributions 106 of the service trajectories with degraded service can be done using one of a number of known clustering techniques, including classical clustering methods such as K-means and DBSCAN. This disclosure presents a preferred embodiment in the paragraphs below.

Figure 2:
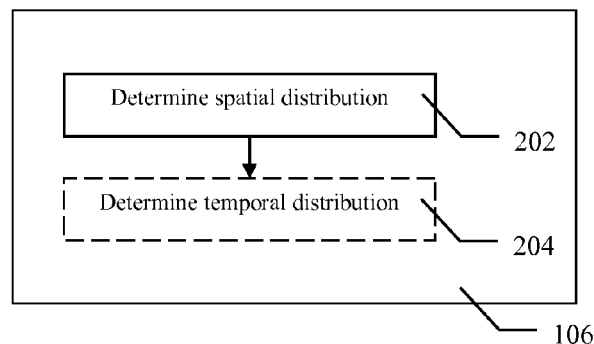
FIG. 2 and FIG. 3 are diagrams illustrating a step of determining distribution of service trajectories in embodiments of the present invention.

Preferably the embodiment of the step of determining distribution of service trajectories, 106, has two stages: spatial clustering, 202, (on its own it allows for heavy hitter identification), and temporal trajectory cluster analysis, 204, as illustrated in FIG. 2. Combining the spatial clustering with the temporal clustering improves accuracy of the method. However, even the spatial clustering leading to identification of a heavy hitter is a good method of identifying a failed network element.

The objective of spatial clustering, 202, is to provide spatial distribution of service trajectories to identify locations, 108, where service degradation of a given service is potentially prevalent and prune the remaining locations, in order to reduce the complexity for the subsequent analysis. In this way the heavy hitter is identified.

Temporal clustering, 204, further analyses the service trajectories to discover service trajectory clusters based on temporal distribution. For example, without temporal clustering the results may show a cluster of service trajectories converged around a specific base station. This indicates that the service degradation is caused by the base station. If, however, the temporal clustering is performed it may show that the service trajectories are clustered in a specific time period, for example between 8:00 and 9:00. This is additional information that helps identify the root cause of the failure. Analysis of operations carried out by the base station and on the base station in this time period helps isolate the process that caused the failure.

In determining heavy hitters, counting trajectories of an area or a node may not be useful, since users or groups of users may exhibit quite different movement patterns. Some users, such as taxi drivers, may have much more frequent movements than ordinary users. So, if heavy hitter is analysed based on trajectories or even trajectory segments, it is possible that they are from very few users or few trajectories, which may not represent problematic status of nodes.

The nodes inside areas most visited by users having service problems may, however, operate error-free, because the corresponding service trajectories may not be those representing service quality problems and also because some areas are heavy hitter in nature due to a large number of mobile terminals operating therein, e.g. shopping centres, busy train stations and airports, etc. Probability of finding users with service problems in such densely populated areas is higher than in other areas.

The objective of the operation of spatial clustering, 202, is to identify suspicious nodes or areas that may cause the service problems. In a preferred embodiment, a further analysis helps eliminate false positive results and identify the cause(s) of the service degradation.

Detecting heavy hitters (e.g. locations that manifest significant occurrences of the problem symptoms) of a given service is typically based on appropriately selected thresholds. For example, if mobile TV video quality impairment (such as picture freezing or no picture) is the symptom event, then heavy hitter access nodes can be defined to be those which more than k users with such service performance impairment visit in an observation window. However, considering the intrinsic nature of a mobile wireless network, a proper definition of heavy hitter should cover not only the occurrence frequency but also the density concentration. For example, in the same period, a cell with 10 problematic users among 100 visitors is more significant than a cell with 10 problematic users among 1000 visitors.

Bearing these considerations in mind, the following paragraphs present a preferred embodiment of the present invention including identifying heavy hitter locations using statistical significance test. By applying the statistical significance test the preferred embodiment eliminates false positive indications and in this way improves accuracy of the method.

In statistics, a result is called statistically significant if it is unlikely to have occurred by chance. The number of users with impaired service performance attached to a failed cell is expected to be statistically significant.

Suppose that in the mobile wireless network being studied, there are n moving users within an observation window (for example, one week). Let $x_i$ (i=1,2, . . . n) be the variable describing whether or not there is a service failure (per service or mix-service) with user i.

$x_i$=1 if user i experiences service problem(s);
$x_i$=0 if user i doesn't experience any service problem(s).

Obviously, $x_1, \ldots, x_n$ are independent. The values of $x_1, \ldots, x_n$ can be obtained from service quality feedbacks. The mean $\mu$ and population variance $\sigma^2$ for $x_i$ can be approximated respectively using the following equations:

$$\mu = \frac{1}{n}\sum_{i=1}^{n} x_i \quad (1)$$

$$\sigma^2 = \frac{1}{n-1}\sum_{i=1}^{n} (x_i - \mu)^2 \quad (2)$$

Consider a particular cell having a total number of visitors equal m and which has k visitors with service problems. Now it is necessary to determine whether this cell has a significant number of visitors for the given service problems, i.e. to test whether k is significant.

Under the null hypothesis that the m visitors are drawn independently and uniformly at random from n moving users:

$$k = \sum_{i=1}^{m} x_i \quad (3)$$

$$E[k] = m * \mu \quad (4)$$

$$\mathrm{Var}[k] = m * \sigma^2 \quad (5)$$

Where $E[k]$ is an expected value of k from all possible values k can take on.

In a large mobile wireless network, visitors of a cell over the observation window (e.g. one week) are reasonably large (>>30). So k is well-approximated by a normal distribution. Therefore, k is considered significant if $$z = \frac{\frac{k}{m} - \mu}{\frac{\sigma}{\sqrt{m}}} \geq z_0, \text{ where } z_0 \text{ is the threshold} \quad (6)$$

For standard normal distribution, using values of $z_0$ as 1.64 and 1.96 provides confidence levels of 95% and 97.5%.

The following paragraphs give a detailed example.

Suppose that in a particular mobile network, the mean of user service failure ratio is 0.02 (e.g. 2% users experience service problems), and standard deviation is 0.141. In a particular cell with 400 visitors during a week's window, there are 16 users experiencing service problems. So the question is whether this ratio (4%) is significantly higher than the mean in the network. That is, are users in this particular cell experiencing much higher service problem compared to a simple random sample of 400 moving users in the network as a whole?

First, the standard error of the mean is calculated as follows:

$$SE = \frac{\sigma}{\sqrt{m}} = \frac{0.141}{\sqrt{400}} = 0.00705 \quad (7)$$

Then, z-score is calculated, which is the distance from the sample mean to the population mean in units of the standard error:

$$z = \frac{\frac{k}{m} - \mu}{\frac{\sigma}{\sqrt{m}}} = \frac{0.04 - 0.02}{0.00705} = 2.84 \quad (8)$$

According to the standard normal (Z) table, the confidence level is 0.9954. Users in this particular cell are experiencing much more severe service problem compared to a simple random sample of 400 moving users in the network as a whole (with 99.54% probability). In other words, it can be said that with probability of 99.54% the 16 users experiencing problems in this particular cell is a statistically significant result (i.e. did not occur by chance). In a practical implementation a threshold is defined as the value $z_0$ in equation (6) and if the confidence level produced in the significance test is equal or above this threshold it is assumed that the test is passed. If the confidence level is below the threshold then the significance test failed, 114, and the cell is filtered out, 116, from further consideration. Depending on implementation, type of service, cell location, etc. the threshold can be defined at different level. For example, it may be relatively low for emergency calls to make sure that any failure to connect to emergency phone number is properly investigated. For other services the threshold may be set at higher levels. Determining specific values of the threshold is not part of the present invention and would be determined for example by the network operator.

Significance test helps removing false indications pointing to the base stations located in popular areas. This is because in popular areas, not just users with service problems use the service. Majority of users in such areas would not experience service degradation. In this way, although this area has a large number of visiting users with service problems, the significance of such visitors is still low compared with the total number of visitors in this cell.

Although statistical significance test is used in this proposal to improve accuracy of identifying heavy hitters by filtering out false indications, this invention doesn't exclude other methods allowing for filtering out false indications, including but not limited to data mining techniques such as PCA, simple smoothing techniques (e.g., exponential averaging), Box-Jenkins ARIMA modeling, and wavelet-based methods, and machine learning.

It may happen that the clustering analysis shows that the service trajectories converge around more than one base station, 110. This may indicate that the two or more base stations developed failures that affect service performance. In a preferred embodiment the statistical significance test helps to determine if indeed more than one base station causes degradation of the service. If the significance test confirms that two or more base stations cause the service degradation the method in a preferred embodiment comprises identifying a network element shared by the nodes in providing the service as the location of the failure, 112. For example, a RNC (radio network controller) failure may trigger service failure for users within multiple cells of the RNC. By correlating with configuration information (such as network topologies), the identified cells can be aggregated into network segments covered by any nodes in the network, such as RNC(s), SGSN(s), GGSN(s) and DNS servers.

As explained above the failed network element causing degradation of a service received by mobile terminals may not necessarily be a base station. The spatial clustering, 202, described above helps identifying base stations that cause service degradation experienced by the mobile terminals. This is because the mobile terminals are directly connected during the service to a particular base station and the correlation between the service records and the movement trajectories clearly point to base stations used by the mobile terminal. This may not be enough, as explained above, to identify the network element that really causes the service degradation if the service degradation spreads across more than one cell.

Figure 3:
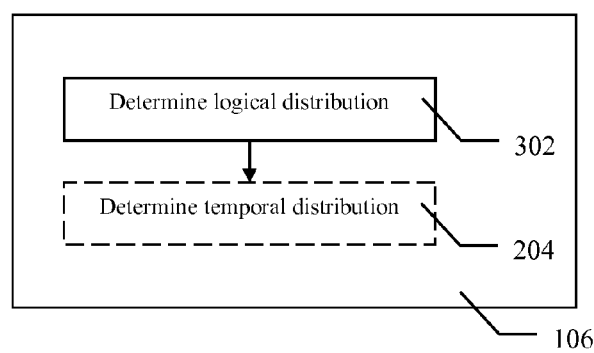
Figure 12:
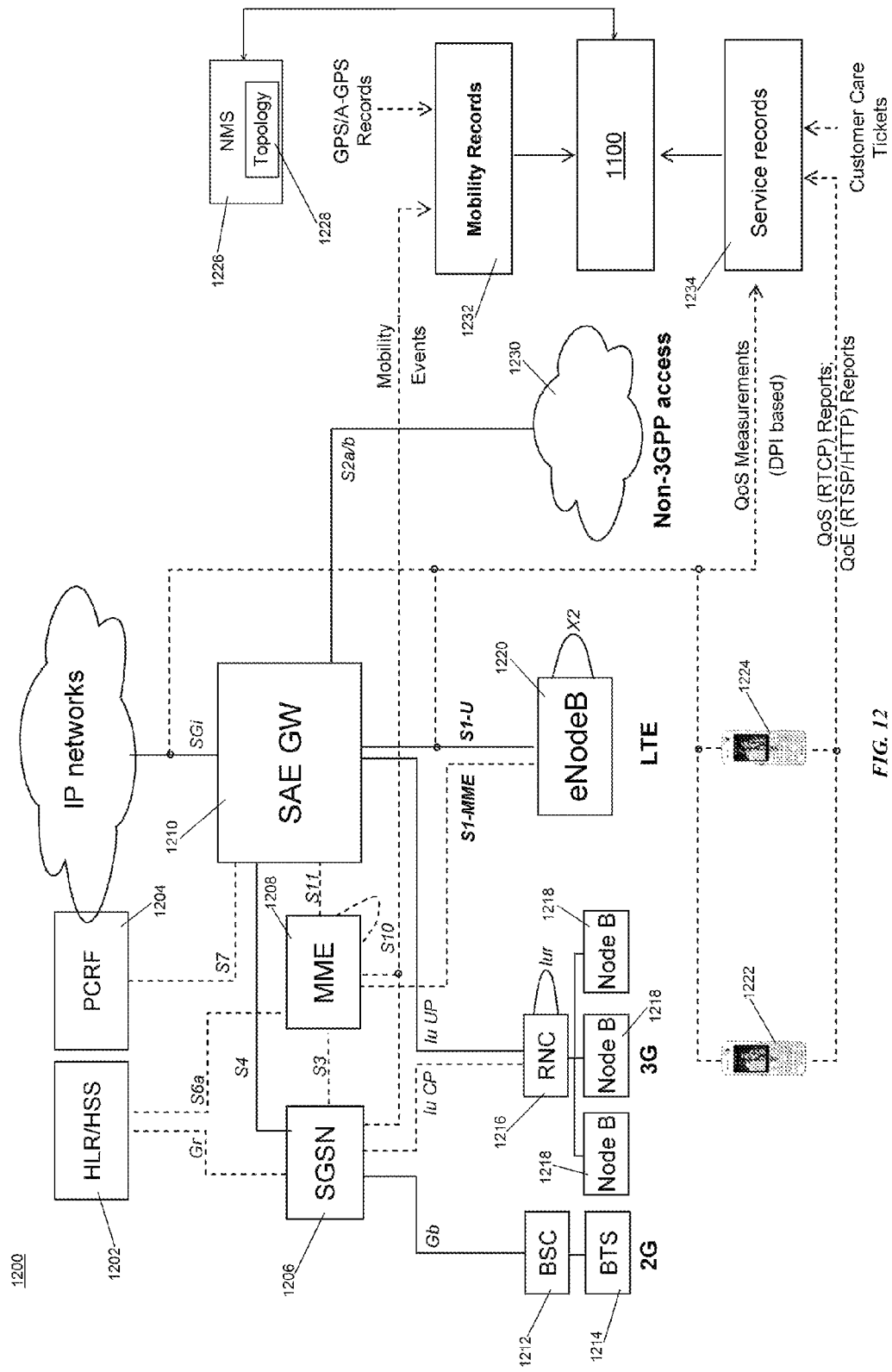
FIG. 12 illustrate wireless communications network in one embodiment of the present invention.

Therefore in a preferred embodiment of the present invention, illustrated in FIG. 3, cluster analysis is used to determine logical distributions of the service trajectories 302, wherein logical distribution takes into account topology of the network. By using network topology data in the clustering operation it is possible to detect that service trajectories of mobile terminals using the three NodeBs 1218 converge around radio network controller (RNC) 1216 as illustrated in FIG. 12.

As mentioned in the background section service degradation may be caused by the soft failures which are short in duration. The symptoms and also the soft failure may disappear after this short period of time and then re-appear causing repeated service degradation. Because the soft failure may disappear it is very difficult to determine which network element failed and is responsible for the service degradation because when network operator receives terminal reports indicating service problem it may be too late to investigate as the soft failure disappeared and the mobile terminal is attached to another base station.

In order to solve the problem of identifying location of the disappearing soft failures the present invention in one embodiment introduces clustering analysis of the service trajectories in time domain (or temporal clustering), 204.

In this step service trajectories identifying a particular network element (e.g. base station, RNC, SGSN, etc) are clustered based on their temporal occurrence. If the service degradation is caused by common causes and is not continuous, it is expected that the trajectories would be clustered in temporal space and the occurrence of the clusters (in time domain) would accompany or follow the occurrence of network or nodal problems.

Clustering of the service trajectories may be caused by other factors, like user movement habits or the rhythm of the day. For example, users may use access to certain services, like web browsing or web TV, between 8:00 am and 9:00 am when they commute to work. Therefore, preferably, the clustered results shall be evaluated in the next step using statistical significance test to ensure that the temporal cluster(s) did not occur by chance. The test in this case is very similar to the previously described and a person skilled in the art would have no problem with implementing it based on the earlier description, and therefore for the sake of brevity the description of the statistical significance test will not be repeated here. The basic idea of evaluating a service trajectory cluster, if the clustering is not caused by a common failure, is that the clustered trajectories, which are from users with service quality problems, would be statistically insignificant among all trajectories of the cell or network element. On the other hand, if the clustering is caused by common failure, most of the trajectories would be affected and therefore, the clustered trajectories are expected to be statistically significant.

Directly applying existing the clustering algorithms like DBSCAN or K-means to this problem is not possible because the existing clustering approaches are designed to cluster "point" data (such as measurement samples) and not "range" data, the distance required for existing clustering algorithms is hard to define in this scenario—a time gap between two trajectories is not useful in cause analysis.

In a preferred embodiment a service trajectory cluster is a subset of the service trajectories of a heavy hitter cell (or any other failed network element causing service degradation).

Figure 9:
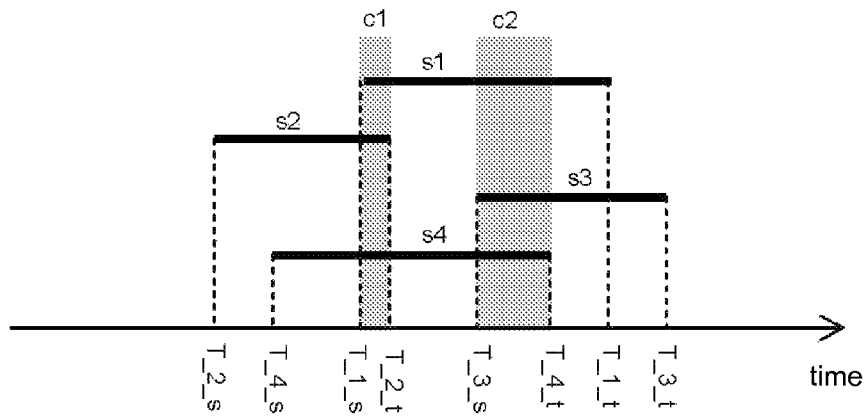
FIG. 9 illustrates creating temporal cluster in one embodiment of the present invention.

The definition of a service trajectory cluster in time domain is based on density of trajectory overlaps and is explained with reference to FIG. 9. Service trajectory s1 has overlaps at a time point (between T_1_s and T_2_t, or between T_3_s and T_4_t) with sufficiently many other service trajectories (e.g. s2 s3 s4) that s1 is considered to be part of a trajectory cluster. MinOverlaps is a threshold, defining a minimum number of overlaps a trajectory may have with other trajectories in order to be considered a cluster.

If any other trajectories in the cluster have at least MinOverlaps overlaps with other trajectories (not limited to those already inside the cluster), the original cluster is expanded (e.g. expandCluster( ) function in the pseudo code illustrated in FIG. 13) by merging new clusters. For example, in FIG. 9, after c1 is identified for trajectory s1, c1 is further expanded by merging c2 with c1 when trajectories overlapping with s4 are examined.

The pseudo code of the proposed algorithm is illustrated in FIG. 13. To further highlight the difference between this clustering algorithm and other clustering algorithms like DBSCAN, the pseudo code is deliberately written using similar functions. Similar to DBSCAN, the temporal clustering algorithm used in embodiments of the present invention is density based. Therefore, the algorithm follows the same rule, e.g. first identifying a cluster and then expanding the cluster.

In particular, the characteristic features of the algorithm are:

(1) It is based on density of overlaps. If the service degradation is caused by common causes, it is expected that the trajectories of the same cell would be clustered in time domain.

(2) Clustering range data, not point data, by analyzing overlaps between trajectories and calculating maximum overlapped trajectory sets.

(3) Only one parameter (MinOverlaps) needs to be pre-defined, as compared to two parameters in DBSCAN (eps and minPts). This significantly increases the accuracy of the clustering algorithm. Where MinOverlaps define a minimum number of overlapping service trajectories in order to be classified as cluster.

In one embodiment the proposed temporal clustering may be applied to a particular service, like web browsing or mobile TV and in alternative embodiments it may also be applied to a group of services to analyze failure patterns between services with similar characteristics.

Figure 8:
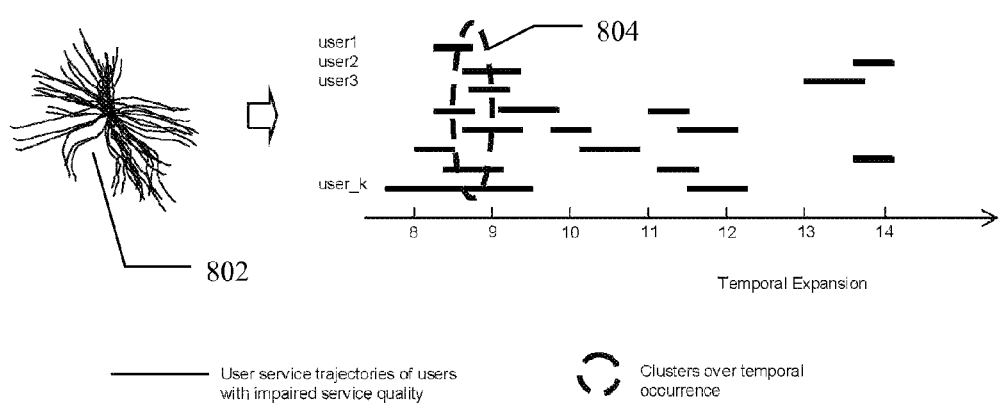
FIG. 8 illustrates spatial and temporal clusters used in embodiments of the present invention.

The temporal clustering is illustrated in FIG. 8, where first a spatial or logical distribution has been determined 802. This cluster of service trajectories clearly converges around a particular location (when a spatial distribution is analysed) and points at a particular base station as the location of cause of the service degradation. If a logical distribution is analysed and the topology of the network is considered the cluster 802 converges around a specific network element, e.g. RNC or SGSN and points at this network element as the location of cause of the service degradation.

When temporal distribution of the service trajectories identified as cluster 802 is analysed it can be seen that they are distributed along the whole time line, but clearly there is a much denser population between hours 8:00 and 9:00. By examining temporal overlapping of the service trajectories it is found that the MinOverlaps threshold has been crossed and a cluster 804 exists.

In a preferred embodiment, if the cluster 804 passes the statistical significance test, 114, and is not considered occurring by chance then it provides further vital information necessary to perform the root cause analysis. The cluster 804 indicates that between 8:00 and 9:00 specific conditions existed in the network element identified by cluster 802, which caused the service degradation. Analysis of configuration data, various logs from the network element in this specific time period dramatically simplifies and speeds up the process of determining the root cause of the service degradation.

Using the temporal clustering gives the present invention an important advantage over the known solutions. It allows for very precise identification of place and time of the problem occurrence that caused the service degradation. In this way the short living soft failures can be identified and in consequence appropriate measures can be taken to address them.

In a preferred embodiment a temporal cluster (or temporal clusters) determined in step 204 is correlated with failure events of the network element around which the service trajectories converge. The correlation is carried out to improve accuracy of identifying root causes of the service failures. A preferred embodiment of correlating the service trajectories with failure events is discussed below. Correlating information relating to service problems across the network advantageously allows for more accurate and faster root cause analysis.

Assume that during a defined time period the total number of service trajectory clusters (temporal clustering) is $N_{s_1}$. During the same time period the number of times that the same, or the same type, failure event (event $e_1$) occur before the temporal clusters within a pre-defined observation window $w_e$ (30 seconds by default) is also determined ($N_{e_1 \to s_1}$). The number of events $e_1$ may refer to the same event occurring repeatedly (for example overloaded CPU of a particular GGSN node), i.e. exactly the same event, or to the same type of event, for example congestion at different base stations. In this way it is assumed that if a temporal cluster of service trajectories is formed within 30 seconds after event $e_1$ then the temporal cluster of service trajectories is caused by the event $e_1$. If the time period between the event and temporal cluster is bigger than 30 seconds then there is no causal relationship between these two. The causal probability between the network failure event and the service quality degradation $P_{e_1 \to s_1}$ is calculated by dividing the number of occurrences $N_{e_1 \to s_1}$ by the total number of service trajectory clusters identified in the defined time period $N_{s_1}$.

$$P_{e_1 \to s_1} = \frac{N_{e_1 \to s_1}}{N_{s_1}} \quad (9)$$

If the calculated causal probability $P_{e_1 \to s_1}$ is above a defined threshold, the causal relation is ascertained.

The present invention in its embodiments is applicable to determining location of a failure that causes degradation of more than one service. Additionally it is also applicable to determining location of multiple failures causing degradation of one service.

Figure 10:
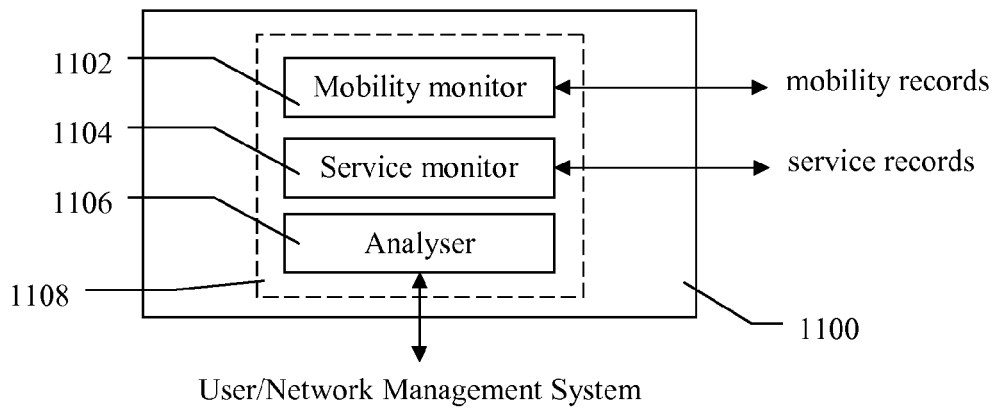
FIG. 10 and FIG. 11 illustrate apparatus in embodiments of the present invention.
Figure 11:
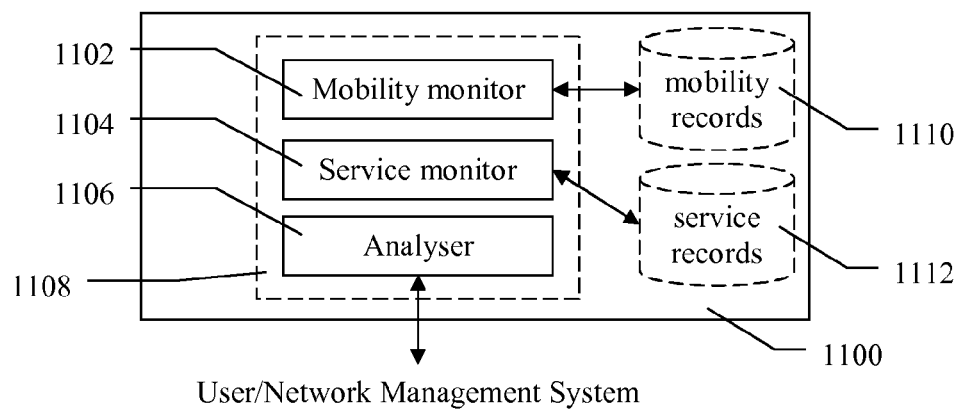

With reference to FIG. 10 and FIG. 11 several embodiments of an apparatus, 1100, for determining location of a failure causing degradation of a service in a mobile communications network in accordance with the present invention are presented. The apparatus may be implemented as a stand alone device or as an additional functionality in a network management/OSS (Operational Support System). The apparatus comprises a mobility monitor module, 1102, which obtains movement trajectories of mobile terminals operating in the network. The movement trajectories are obtained from mobility records stored in the wireless communications network and can be in a form of GPS data or roaming data. If a mobile terminal is equipped with a GPS receiver and records the GPS data and then provides this data to the network then the apparatus according to a preferred embodiment of the present invention uses the GPS data to determine movement trajectories of the mobile terminal. It is understood, however, that not all mobile terminal are equipped with GPS circuitry and even those mobile terminals having built-in GPS receivers may not keep the GPS receivers switched on all the time as this consumes battery. Moreover, even if such GPS data are collected by a mobile terminal the user may not agree to report them to the network. All these clearly suggest that GPS data is not always available to the mobility monitor module 1102. Therefore in a preferred embodiment the mobility monitor module 1102 accesses roaming data to determine movement trajectory of the mobile terminal. The difference between GPS based and roaming based movement trajectories is illustrated in FIG. 7 and discussed earlier in the accompanying description.

The apparatus, 1100, further comprises a service monitor module, 1104, adapted to determine service trajectories of the mobile terminals. The service monitor module, 1104, determines the service trajectories by correlating the movement trajectories of individual mobile terminals with service session records of the mobile terminals. Specific details of this operation are illustrated in FIG. 5 and FIG. 6 and discussed earlier in the accompanying description.

The apparatus further comprises an analyser module, 1106, adapted to determine distributions (spatial, logical and/or temporal) of the service trajectories of mobile terminals with degraded service. The analyser module, 1106, is further adapted to identify a network element around which the service trajectories converge as the location of the failure.

In one embodiment the mobility monitor, 1102, service monitor, 1104 and analyser, 1106, modules are implemented as discrete components and in an alternative embodiment they are parts of one or more processor units 1108.

In one embodiment the apparatus, 1100, comprises a first database, 1110, storing mobility records of the mobile terminals operating in the network and/or a second database, 1112, storing service records of the mobile terminals. In an alternative embodiment, however, the mobility and service records are stored in the communications network and the apparatus, 1100, only accesses these records when necessary.

Preferably the apparatus, 1100, is also configured to access network topology data and/or failure events data of the network elements.

In various embodiments the analyser module, 1106, performs a cluster analysis to determine spatial distribution of the service trajectories and/or logical distribution of the service trajectories, wherein for the spatial distribution the mobility records are used and for the logical distribution the mobility records are used together with the topology data. The analyser module 1106 is also adapted to perform cluster analysis to determine temporal distributions of the service trajectories as described earlier in embodiments of the method of the present invention.

The apparatus, 1100, obtains mobility records from roaming data provided by SGSN, 1206, illustrated in FIG. 12. The GPS data used as mobility records of mobile terminals may be records of Assisted GPS (A-GPS) measurements. Service records, in turn, are from various QoS measurements carried out by service quality monitoring systems, from QoS and/or QoE reports directly from the mobile terminals 1224 or from customer care tickets.

Other operations performed by the analyser module 1106 in various embodiments include carrying out statistical significance tests, 114, and statistical correlation between network elements identified as location of failures and failure event occurrence relevant to the identified elements.

With reference to FIG. 12 a mobile communications network, 1200, in one embodiment of the present invention is disclosed. The illustrated network includes various parts that operate in accordance with different wireless technologies and standards. Mobile terminals 1222 and 1224 connect to the network via 2G, 3G or LTE wireless access the networks, where in 2G network the wireless terminals connect to a Base Transceiver Station (BTS), 1214, which is controlled by a Base Station Controller (BSC) 1212. In 3G network a wireless connection is established between the mobile terminals and a NodeB, 1218 controlled by a Radio Network Controller (RNC), 1216. When the wireless terminals operate in LTE network they connect to eNodeB 1220, which in LTE network also performs radio control functions. The mobile communications network 1200 comprising parts operating in these three different technologies is a very likely real life scenario because the networks currently deployed evolved from the second generation, 2G, networks through networks of the $3^{rd}$ generation, 3G, to Long Term Evolution (LTE) networks. In the process of upgrading the network to a higher generation one the old one in majority of cases was left in place and now the wireless access is provided within one network by different access technologies. As illustrated in FIG. 12 the network 1200 comprises a number of network elements 1202-1220, where at least part of the network elements is in direct communication with the mobile terminals 1222, 1224. The basic topology of the network illustrated in FIG. 12 is clear and would be understood by a person skilled in the art. The network 1200 further comprises an apparatus 1100 that is configured to determine location of a failure causing degradation of a service in the mobile communications network. The apparatus 1100 comprises a mobility monitor module, 1102, which is configured to obtain movement trajectories of mobile terminals operating in the network. The movement trajectories are obtained from mobility records, 1232, stored in the wireless communications network and can be in a form of GPS data or roaming data. The apparatus, 1100, further comprises a service monitor module, 1104, adapted to determine service trajectories of the mobile terminals by correlating the movement trajectories of individual mobile terminals with service session records, 1234, of the mobile terminals. The apparatus further comprises an analyser module, 1106, which is adapted to determine distributions (spatial, logical and/or temporal) of the service trajectories of mobile terminals with degraded service. The analyser module, 1106, is further adapted to identify a network element around which the service trajectories converge as the location of the failure.

In a preferred embodiment the network 1200 comprises a network management system 1226 storing topology information 1228 which is accessed by the apparatus 1100 in the process of determining logical distribution of the service trajectories.

Although the description above disclosed embodiments of the invention in the context of mobile communications network based on specific technologies, in particular 2G, 3G and LTE networks the invention is also applicable to other types of wireless mobile networks, e.g. WiMax, illustrated in FIG. 12 as Non-3GPP access 1230.

In yet another embodiment of the present invention a computer program product is disclosed. The computer program product, stored on a computer readable medium, when executed on a computer is adapted to perform the steps of the method described earlier.

It is important to appreciate that the present invention in its described embodiments may be implemented in a large wireless network, which may contain thousands of radio base stations, a large number of controllers and a number of core nodes, and this is not possible with the methods known in the art. Implementing a full-scale monitoring solution based on the known in the art probing methods is not feasible. The present invention, however, helps localise problematic network segments or network elements and then more detailed analysis of the suspected network element can be carried out. Alternatively the results produced by the present invention can be used to determine measurement points for the known probing methods. Additional advantage of the present invention over the probing methods is that it is a passive analysis that does not affect user traffic or any existing systems, as compared to active probing solutions.

The invention claimed is:

1. A method of determining a location of a failure causing degradation of a service in a mobile communications network comprising:
   obtaining movement trajectories of mobile terminals operating in the network, wherein the movement trajectory of a mobile terminal is the path the moving mobile terminal follows through space as a function of time;
   determining service trajectories for the mobile terminals by correlating the movement trajectories of individual mobile terminals with service session records of the mobile terminals, wherein the service session records of the same service from the same mobile terminal are merged if a time gap between the two service session records is not longer than an observation window;
   determining distribution of the service trajectories of mobile terminals with degraded service; and
   identifying a network element around which the service trajectories converge as the location of the failure.

2. The method according to claim 1, wherein in the step of determining service trajectories only service trajectories of mobile terminals with degraded service are determined.

3. The method according to claim 1, wherein if there is more than one node around which the service trajectories converge the method further comprises identifying a network element shared by the nodes in providing the service as the location of the failure.

4. The method according to claim 3, wherein cluster analysis is used to determine spatial distribution of the service trajectories.

5. The method according to claim 4, wherein cluster analysis is used to determine logical distribution of the service trajectories.

6. The method according to claim 4, further comprising using cluster analysis to determine temporal distribution of the service trajectories.

7. The method according to claim 6, further comprising carrying out a test of statistical correlation between a temporal cluster and failure event occurence.

8. The method according to claim 4, comprising:
   clustering service trajectories in a time domain, wherein the service trajectories are part of the same cluster if the service trajectories at least partially overlap in the time domain and a number of overlapping service trajectories is equal or above a threshold; and
   in the step of identifying a location of the failure, identifying the network element as the location of the failure only if the service trajectories converge around the network element and a cluster of service trajectories in the time domain is formed.

9. The method according to claim 1, further comprising carrying out a statistical significance test based on service trajectories clustered around a network element and identifying the network element as the location of the failure; and filtering out the network element from further consideration if the statistical significance test failed.

10. The method according to claim 1, wherein the failure causes degradation of more than one service.

11. The method according to claim 1, wherein the service degradation is caused by more than one failure.

12. An apparatus for determining a location of a failure causing degradation of a service in a mobile communications network comprising:
   a mobility monitor module configured to obtain movement trajectories of mobile terminals operating in the network, wherein the movement trajectory of a mobile terminal is the path the moving mobile terminal follows through space as a function of time;
   a service monitor module configured to determine service trajectories of the mobile terminals by correlating the movement trajectories of individual mobile terminals with service session records of the mobile terminals, wherein the service session records of the same service from the same mobile terminal are merged if a time gap between the two service sessions records is not longer than an observation window; and
   an analyser module comprising a processor, the analyser module being configured to determine distribution of the service trajectories of mobile terminals with degraded service and to identify a network element around which the service trajectories converge as the location of the failure.

13. The apparatus according to claim 12 configured to access network topology data.

14. The apparatus according to claim 12 configured to access failure events data of the network elements.

15. The apparatus according to claim 12, wherein the analyser module is further configured to perform a cluster analysis to determine spatial distribution of the service trajectories.

16. The apparatus according to claim 15, wherein the analyser module is further configured to perform a cluster analysis to determine temporal distribution of the service trajectories.

17. The apparatus according to claim 15, wherein the analyser module is further configured to cluster service trajectories in a time domain, wherein the service trajectories are part of the same cluster if the service trajectories at least partially overlap in the time domain and a number of overlapping service trajectories is equal or above a threshold; and to identify the network element as the location of the failure only if the service trajectories converge around the network element and a cluster of service trajectories in the time domain is formed.

18. The apparatus according to claim 17, wherein the analyser module is further configured to carry out a statistical significance test based on data related to distributions of the service trajectories; and to filter out the service trajectory from further consideration if the statistical significance test failed.

19. The apparatus according to claim 12, wherein the analyser module is further configured to perform a cluster analysis to determine logical distribution of the service trajectories.

20. The apparatus according to claim 12, wherein the analyser module is further configured to perform a statistical significance test based on service trajectories of the monitored network identifying the network element as the location of the failure; and to filter out the network element from further consideration if the statistical significance test failed.

21. The apparatus according to claim 12, wherein the analyser module is further configured to merge two service session records of the same service, from the same mobile terminal, if a time gap between the two service session records is not longer than an observation window.

22. The apparatus according to claim 12, wherein the analyser module is further configured to carry out statistical correlation between the network element identified as the location of failure and a failure event occurrence relevant to the identified elements.

23. A mobile communications network comprising:
- a plurality of network elements, at least part of the network elements being in communication with a second plurality of wireless mobile terminals operating in the network and the network further comprising an apparatus for determining a location of a failure causing degradation of a service in the mobile communications network;
- the apparatus comprising a mobility monitor module configured to obtain movement trajectories of mobile terminals operating in the network, wherein the movement trajectory of a mobile terminal is the path the moving mobile terminal follows through space as a function of time;
- a service monitor module configured to determine service trajectories of the mobile terminals by correlating the movement trajectories of individual mobile terminals with service session records of the mobile terminals, wherein the service session records of the same service from the same mobile terminal are merged if a time gap between the two service session records is not longer than an observation window; and
- an analyser module configured to determine distribution of the service trajectories of mobile terminals with degraded service and to identify a network element around which the service trajectories converge as the location of the failure.

24. A non-transitory computer program product adapted to perform, when executed on a computer, a method of determining a location of a failure causing degradation of a service in a mobile communications network comprising the steps of:
- obtaining movement trajectories of mobile terminals operating in the network, wherein the movement trajectory of a mobile terminal is the path the moving terminal follows through space as a function of time;
- determining service trajectories for the mobile terminals by correlating the movement trajectories of individual mobile terminals with service session records of the mobile terminals, wherein the service sessions records of the same service from the same mobile terminal are merged if a time gap between the two service session records is not longer than an observation window;
- determining distribution of the service trajectories of mobile terminals with degraded service; and
- identifying a network element around which the service trajectories converge as the location of the failure.

* * * * *